US012650142B2

(12) United States Patent

Smith

(10) Patent No.: US 12,650,142 B2

(45) Date of Patent: Jun. 9, 2026

(54) SELF-DRILLING SCREW FOR LAYERED FLOORING

(71) Applicant: All State Fastener Corporation, Roseville, MI (US)

(72) Inventor: Boyd J. Smith, Xenia, OH (US)

(73) Assignee: All State Fastener Corporation, Roseville, MI (US)

( * ) Notice: Subject to any disclaimer, the term of this patent is extended or adjusted under 35 U.S.C. 154(b) by 0 days.

(21) Appl. No.: 18/965,637

(22) Filed: Dec. 2, 2024

(65) Prior Publication Data

US 2026/0153115 A1 Jun. 4, 2026

(51) Int. Cl.
*E04B 2/00* (2006.01)
*F16B 25/00* (2006.01)

(52) U.S. Cl.
CPC ...... *F16B 25/0021* (2013.01); *F16B 25/0063* (2013.01)

(58) Field of Classification Search
CPC .......................... F16B 25/0021; F16B 25/0063
See application file for complete search history.

(56) References Cited

U.S. PATENT DOCUMENTS

| | | |
|---|---|---|
| 3,916,757 A | 11/1975 | Wilson |
| 4,705,441 A | 11/1987 | Arnold |
| 5,758,467 A * | 6/1998 | Snear ........................ E04C 2/20 |
| | | 52/592.1 |

| | | |
|---|---|---|
| 6,185,896 B1 * | 2/2001 | Roberts ............... F16B 25/0047 |
| | | 52/537 |
| 6,209,267 B1 * | 4/2001 | Dantzer ........... E04F 15/02044 |
| | | 52/480 |
| 6,250,866 B1 | 6/2001 | Devine |
| 6,676,353 B1 | 1/2004 | Haytayan |
| 6,698,987 B1 | 3/2004 | Dicke |
| 6,872,042 B2 | 3/2005 | Panasik et al. |

(Continued)

FOREIGN PATENT DOCUMENTS

| | | |
|---|---|---|
| CN | 102052377 A | 5/2011 |
| CN | 103128494 A | 6/2013 |

(Continued)

OTHER PUBLICATIONS

"Steel Self-Drilling Tapping Screws"; Book of Fastener Standards, Industrial Fasteners Institute, 2011; p. 784.

(Continued)

*Primary Examiner* — Basil S Katcheves

(74) *Attorney, Agent, or Firm* — Bodman PLC

(57) ABSTRACT

A system includes a flooring substrate having a hollow core, a support substrate supporting the flooring substrate, and a fastener engaging the flooring substrate to the support substrate. The fastener includes a head portion for receiving a screw driver configured to rotate the fastener about an axis and a shank portion extending along the axis from the head portion to a distal end. The shank portion includes a threaded section between the distal end and the head portion, and an unthreaded section between the distal end and the threaded section. The threaded section has an outer threaded edge extending helically along the shank portion. The unthreaded section has a length along the axis that is at least a depth between the flooring substrate and the support substrate.

9 Claims, 8 Drawing Sheets

(56) References Cited

U.S. PATENT DOCUMENTS

| | | | | |
|---|---|---|---|---|
| 6,918,221 | B2 * | 7/2005 | Williams | E04B 5/026 |
| | | | | 52/592.1 |
| 7,360,343 | B1 * | 4/2008 | Spransy | E04F 15/02458 |
| | | | | 52/480 |
| 8,011,148 | B2 * | 9/2011 | Bertke | E04F 21/20 |
| | | | | 52/79.5 |
| 8,641,492 | B2 * | 2/2014 | Meyer | H05K 7/20745 |
| | | | | 52/220.8 |
| 8,898,999 | B1 * | 12/2014 | Kugler | E04F 15/02464 |
| | | | | 52/126.6 |
| 9,803,376 | B1 * | 10/2017 | Deel | E04F 15/06 |
| 11,428,015 | B2 * | 8/2022 | Huss | B62B 3/008 |
| 2007/0062146 | A1 * | 3/2007 | Van Dijk | E04C 2/22 |
| | | | | 52/580 |
| 2007/0116540 | A1 * | 5/2007 | Su | F16B 25/0089 |
| | | | | 411/387.1 |
| 2008/0124187 | A1 | 5/2008 | Haytayan | |
| 2009/0269161 | A1 * | 10/2009 | Stager | F16B 25/0015 |
| | | | | 411/311 |
| 2009/0311074 | A1 * | 12/2009 | Friederich | F16B 25/106 |
| | | | | 411/387.4 |
| 2010/0094356 | A1 | 4/2010 | Varela et al. | |
| 2010/0183400 | A1 * | 7/2010 | Chen | F16B 25/0021 |
| | | | | 411/394 |
| 2013/0097952 | A1 * | 4/2013 | Flynn | E04D 3/28 |
| | | | | 52/309.1 |
| 2019/0063480 | A1 * | 2/2019 | Lajewardi | F16B 25/103 |
| 2020/0277980 | A1 * | 9/2020 | Ramachandran | F16B 25/0042 |
| 2022/0034352 | A1 * | 2/2022 | Kun-Hao | F16B 25/0021 |
| 2022/0213919 | A1 * | 7/2022 | Gong | F16B 25/0084 |
| 2023/0129583 | A1 * | 4/2023 | Ruszkiewicz | F16B 25/0084 |
| 2023/0213054 | A1 * | 7/2023 | Lammer-Klupazek | E04D 5/145 |
| | | | | 52/506.05 |

FOREIGN PATENT DOCUMENTS

| | | |
|---|---|---|
| EP | 2811182 A1 | 12/2014 |
| EP | 4071371 A1 | 10/2022 |
| FR | 1428786 A | 2/1966 |
| WO | 2014018542 A1 | 1/2014 |
| WO | 2019046035 A1 | 3/2019 |
| WO | 2020109760 A1 | 6/2020 |

OTHER PUBLICATIONS

International Search Report and Written Opinion, PCT Application No. PCT/US2025/057499, mailed Mar. 4, 2026, 11 pp.

* cited by examiner

SELF-DRILLING SCREW FOR LAYERED FLOORING

TECHNICAL FIELD

The present disclosure relates generally to a self-drilling fastener, and more specifically to a self-drilling fastener for layered flooring, assemblies, subassemblies, and components thereof.

BACKGROUND

Self-drilling fasteners are well known and widely used for drilling into a variety of substrates without pre-pierced pilot holes. More particularly, it is well known to use self-drilling fasteners for securing floor panels for instance in trailer bodies to attach a floor surface to a metal frame or substrate. However, in layered material, and in particular with a hollow cavity or gap between the two layers, point breakage of the fasteners may result as tapping in one layer begins before the completion of drilling into the other layer. Additionally, pivoting or wobbling of the fastener may occur due to threaded edges of the fastener engaging an outer layer before the inner layer has been pierced. It would be beneficial to provide a self-drilling fastener that may be installed automatically in a layered flooring system.

SUMMARY

According to the disclosure, a flooring system includes a flooring substrate having a hollow core, a support substrate supporting the flooring substrate, and a fastener engaging the flooring substrate to the support substrate. The fastener includes a head portion and a shank portion. The head portion is for receiving a screw driver configured to rotate the fastener about an axis. The shank portion extends along the axis from the head portion to a distal end and includes a threaded section between the distal end and the head portion and an unthreaded section between the distal end and the threaded section. The threaded section has an outer threaded edge extending helically along the shank portion. The unthreaded section has a length along the axis that is at least a depth between the flooring substrate and the support substrate.

In some examples, the distal end of the fastener includes a cutting portion configured to cut through the flooring substrate and the support substrate. The cutting portion may include a plurality of cutting flutes on diametrically opposed sides of the cylindrical shank. In some examples, the unthreaded section may have a circumference that tapers from the threaded section to the distal end. In examples, the threaded section may have a length which is at least a depth between the floor surface of the flooring substrate and the upper surface of the support substrate.

In some examples, the flooring substrate may include an upper floor surface and a lower flange defining the hollow core. The lower flange may be supported on an upper surface of the support substrate. The unthreaded section may be a length at least equal to the depth between the floor surface of the flooring substrate and the upper surface of the support substrate. In some examples, the flooring substrate is comprised of a first material and the support substrate is comprised of a second material. In other examples, the flooring substrate and the support substrate may be comprised of the same material. For example, the flooring substrate may be comprised of aluminum and the support substrate may be comprised of aluminum or steel.

Also, according to the disclosure, a fastener for installation in a two-layered material includes a cylindrical shank. The cylindrical shank includes a head portion, an unthreaded section, and a threaded section. The head portion is at a proximate end and is configured to receive a driver for rotating the shank. The unthreaded section is at a distal end and is configured to cut into the two-layered material. The threaded section has an outer threaded edge extending helically along the cylindrical shank and is positioned between the head portion and the unthreaded section. A length of the unthreaded section is proportional to a depth between a first layer of installation material and a second layer of installation material.

Also according to the disclosure, a method for installing a fastener in a two-layered material includes providing an automated gang screw driver with a fastener, the fastener comprising an unthreaded section, a threaded section, and a head portion configured to be engaged by the automated gang screw driver, drilling the unthreaded section through a first layer of material and into the surface of a second layer of material, and screwing the threaded section into the first layer of the material, where the threaded section is configured to engage the first layer of material after the unthreaded section is drilled into the surface of the second layer of material.

BRIEF DESCRIPTION OF THE DRAWINGS

Like reference numerals indicate like parts throughout the drawings.

DETAILED DESCRIPTION

Figure 1:
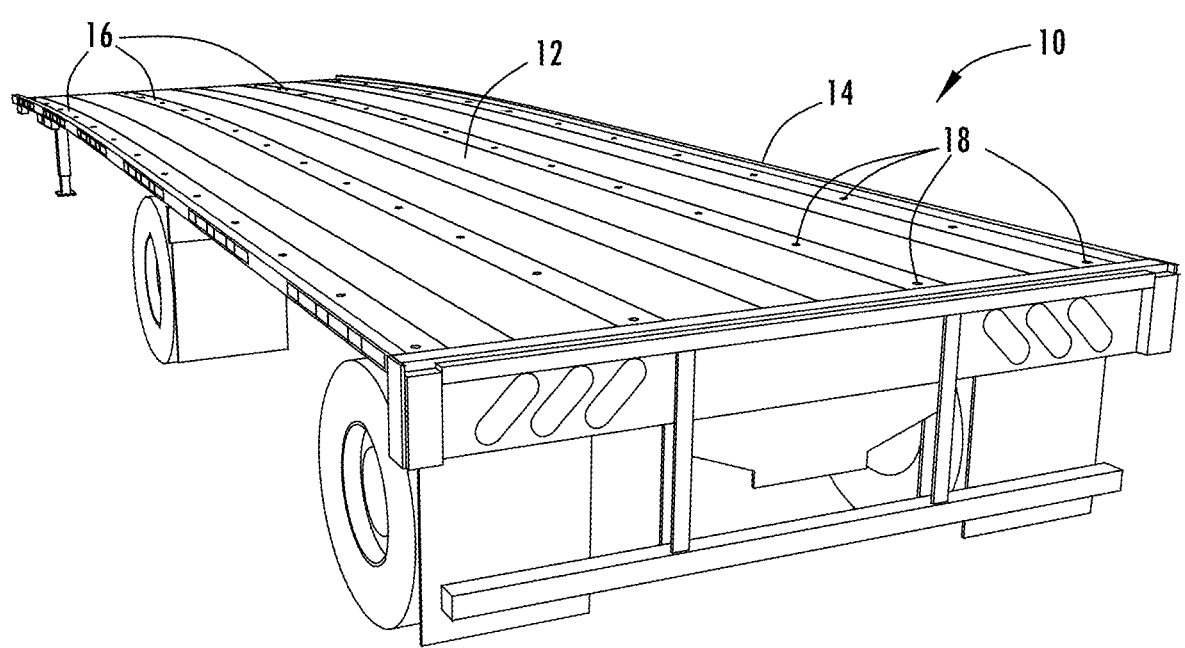
FIG. 1 is perspective view of a trailer having self-drilling fasteners.
Figure 2:
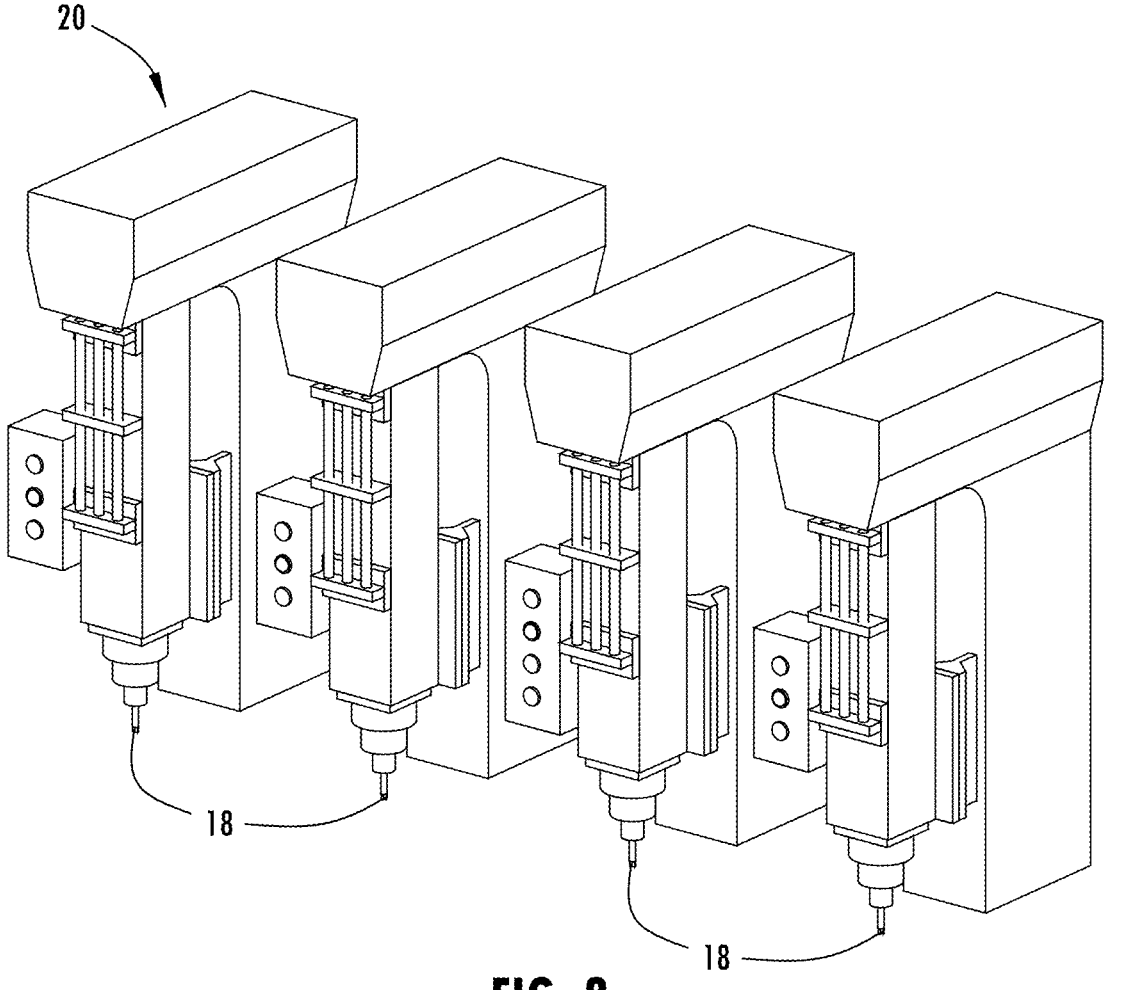
FIG. 2 is a schematic view of an automated gang driver for installing self-drilling fasteners.

Embodiments shown in the drawings and described herein provide a fastener system for installing self-drilling screws on layered flooring. Referring to FIG. 1, the fastener system 10 may be used for installing layered flooring 12, which may be utilized in the trailer industry on an automotive trailer 14. In some examples as illustrated in FIG. 1, the automotive trailer 14 may be a flat bed trailer. In other examples, the automotive trailer may be a dry van trailer, a refrigerated van, a special purpose trailer, or other vehicle or trailer type with two-layered flooring. In examples, the layered flooring may be comprised of extruded aluminum. In other examples, the layered flooring may include a first layer of flooring substrate such as aluminum and a second layer of support substrate such as aluminum or steel. As shown in FIG. 1, the trailer 14 may include a plurality of fastening rows 16 in the first layer of flooring substrate in which a plurality of fasteners 18 are installed to attach the flooring substrate to the support substrate (as shown in 5A-5C). Referring to FIG. 2, the fasteners 18 are configured to be installed in the layered flooring 12 with an automated gang driver 20. In examples, the automated gang driver 20 may be provided with the disclosed fasteners 18 to automatically install the fasteners 18 through a first and second layer of the layered flooring 12 without pivoting or breaking the fasteners between the two layers. In additional examples, the fasteners 18 may be automatically driven into flooring and secured the underlying support substrate with alternative automated drivers and drilling mechanisms.

Figure 3:
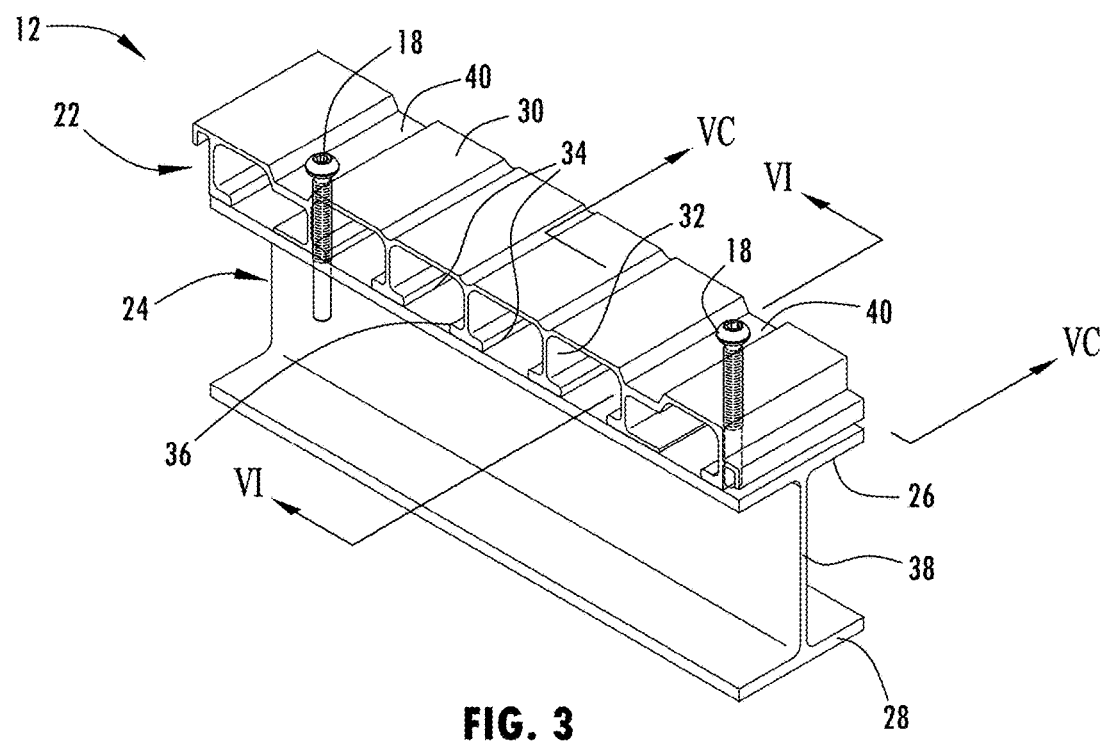
FIG. 3 is a perspective, schematic view of self-drilling fasteners in a layered floor having an I-beam cross support.

Referring to FIG. 3, a first embodiment of the layered flooring is illustrated as having an upper layer comprising of a flooring substrate 22 and a lower layer comprising of a support substrate 24. In some examples, the flooring substrate 22 may be comprised of aluminum. In other examples, the flooring substrate may be comprised of other materials such as steel. In some examples, the support substrate 24 is comprised of aluminum. In other examples, the support substrate may be comprised of steel. As illustrated in FIG. 3, the support substrate 24 may be an I-beam cross support having an upper surface 26 extending the length of the support substrate 24 and a lower surface 28 extending the length of the support substrate 24, the lower surface 28 extending parallel to the upper surface 26. A vertical support 38 extends between a midsection of the upper surface 26 and a midsection of the lower surface 28 along the length of the support substrate 24. The flooring substrate 22 is provided on the upper surface 26 of the support substrate 24. The flooring substrate 22 includes a floor surface 30 extending along the length of the flooring substrate 22. The floor surface 30 is positioned above the upper surface 26 via a plurality of vertical supports 32 creating at least one hollow core 34, and in some examples as shown, a plurality of hollow cores 34 between the floor surface 30 and the upper surface 26 of the support substrate 24. The flooring substrate 22 includes lower flanges 36 attached to the vertical supports 32 for positioning the flooring substrate 22 on the upper surface 26 of the support substrate 24. The floor surface 30 may include a plurality of concave ridges 40 extending into the cross-section of the flooring substrate 22. The ridges 40 provide an attachment surface for drilling fasteners 18 into the flooring substrate 22. The ridges 40 extend into the cross-section a depth correlating to a depth of a head portion of the fasteners 18 to ensure a generally flush surface between the fasteners 18 and the floor surface 30.

Figure 4:
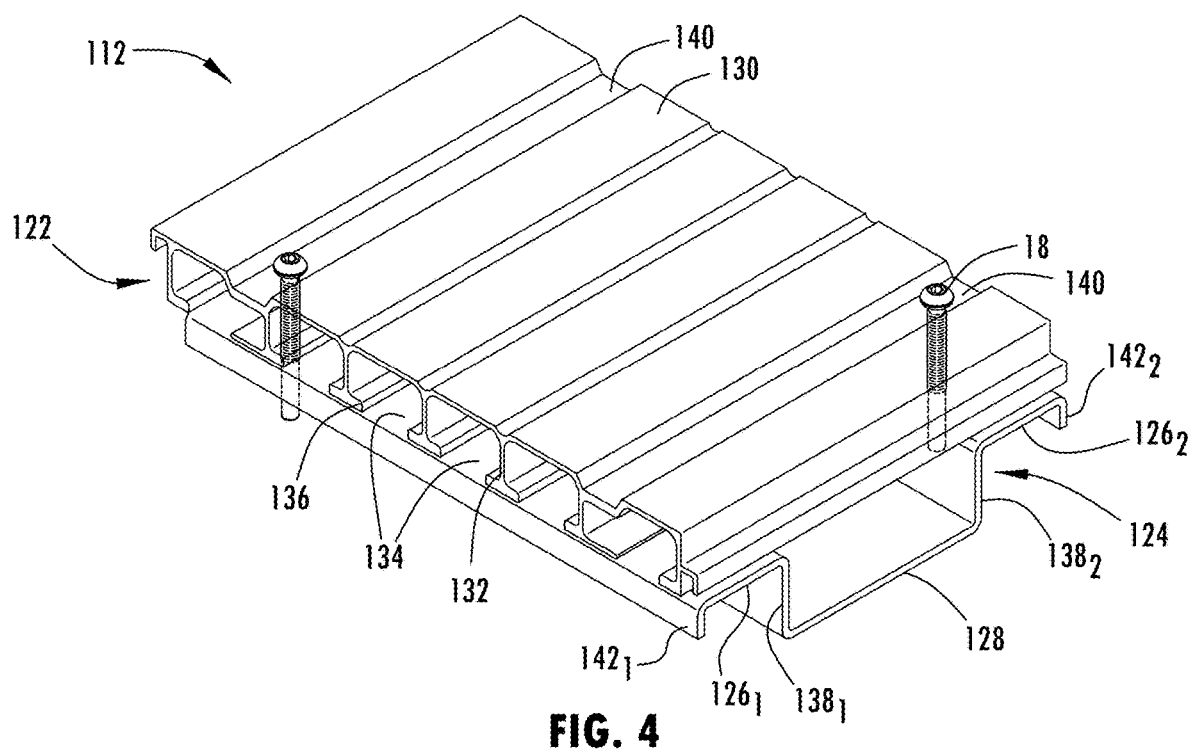
FIG. 4 is a perspective, schematic view of self-drilling fasteners in a layered floor having a hat-shaped cross support.

Referring to FIG. 4, a second embodiment of the layered flooring is illustrated as having an upper layer comprising of a flooring substrate 122 and a lower layer comprising of a support substrate 124. In some examples, the flooring substrates 122 may be comprised of aluminum. In other examples, the flooring substrate may be comprised of other materials such as steel. In some examples, the support substrate 124 is comprised of aluminum. In other examples, the support substrate may be comprised of steel. As illustrated in FIG. 4, the support substrate 124 may be a hat-shaped cross support having a first upper surface 1261 and a second upper surface 1262 separated from the first upper surface 1261. The first upper surface 1261 and a second upper surface 1262 may extend the length of the support substrate 124. The support substrate 124 may include a lower surface 128 extending along the length of the support substrate 124 and below a plane of the first and second upper surfaces 1261, 1262. The first upper surface 1261 may include a first flange 1421 extending downward from a first end and a first vertical support 1381 extending downward from a second end. The first vertical support 1381 connects to a first end of the lower surface 128. The second upper surface 1262 may also include a second flange 1422 extending downward from a second end and a second vertical support 1382 extending downward from a first end. The second vertical support 1382 connects to a second end of the lower surface 128. Therefore, the first upper surface 1261, the first vertical support 1381, the lower surface 128, the second vertical support 1382, and the second upper surface 1262 may define an upside down hat-shaped support substrate 124. The flooring substrate 122 is provided on top of the support substrate 124 and extends between the first and second upper surfaces 1261, 1262. The flooring substrate 122 includes a floor surface 130 extending along the length of the flooring substrate 122. The floor surface 130 is raised above the first and second upper surfaces 1261, 1262 via a plurality of vertical supports 132 creating at least one hollow core 134, and in some examples, a plurality of hollow cores 134 between the floor surface 130 and the upper surfaces 1261, 1262 of the support substrate 124. The flooring substrate 122 includes lower flanges 136 attached to the vertical supports 132 for positioning the flooring substrate 122 on the upper surfaces 1261, 1262 of the support substrate 124. The floor surface 130 may include a plurality of concave ridges 140 extending into the cross-section of the flooring substrate 122. The ridges 140 provide an attachment surface for drilling fasteners 18 into the flooring substrate 122. The ridges 140 extend into the cross-section a depth correlating to a depth of a head portion of the fasteners 18 to ensure a generally flush surface between the fasteners 18 and the floor surface 130.

Figure 5A:
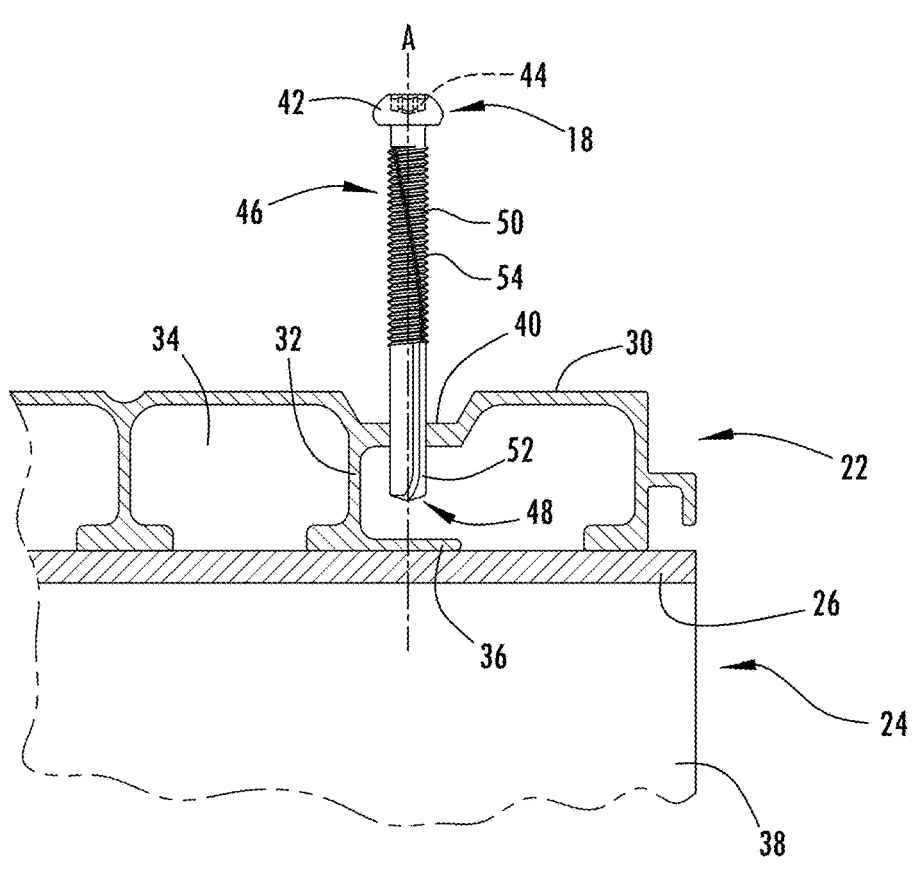
FIG. 5A is a schematic view of a self-drilling fastener in a first installation position.
Figure 5B:
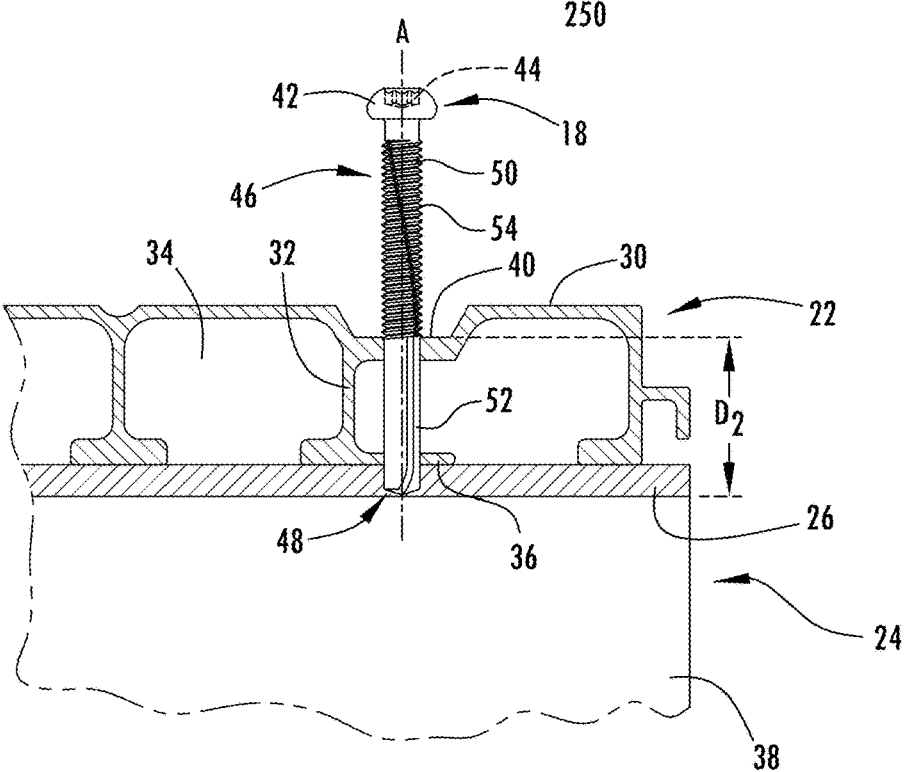
FIG. 5B is a schematic view of a self-drilling fastener in a second installation position.
Figure 5C:
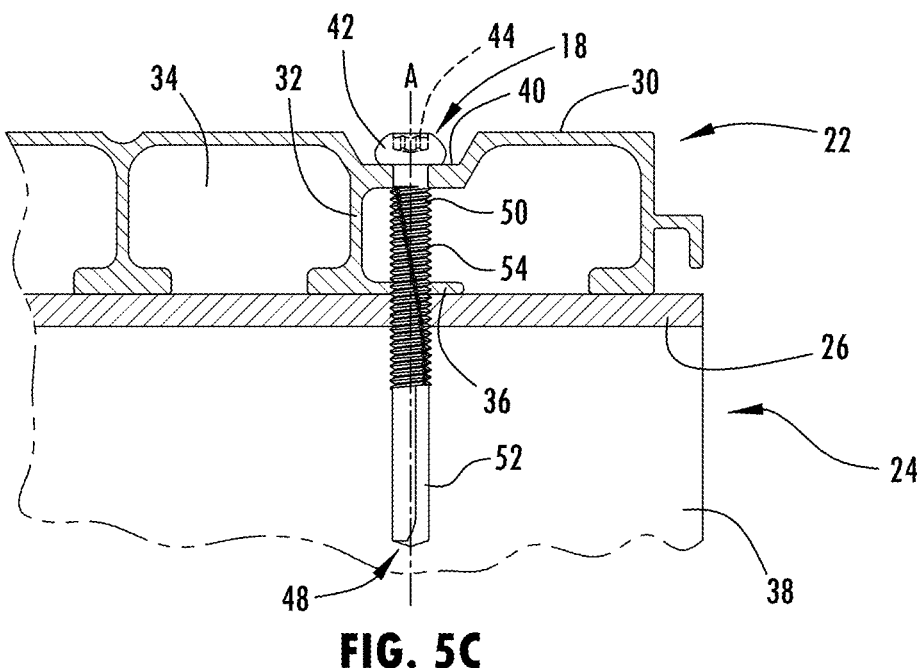
FIG. 5C is a schematic view of a self-drilling fastener in a third installation position as shown along line VC in FIG. 3.

Referring to FIGS. 5A-5C, the process of installing the fastener 18 into the layered flooring 12 of FIG. 3 is illustrated. The fastener 18 includes a head portion 42 which may include a drive 44 for receiving a driver such as from an automated gang driver 20 as disclosed in FIG. 2 or a manual screw driver. The driver 20 is configured to rotate the fastener 18 about an axis of the fastener A. Extending from the head portion 42 is a shank portion 46 extending along the axis A from the head portion 42 to a distal end 48. The shank portion 46 includes a threaded section 50 positioned between the head portion 42 and the distal end 48 and an unthreaded section 52 positioned between the threaded section 50 and the distal end 48. The threaded section 50 includes an outer threaded edge 54 which extends helically along the shank portion 46 in the threaded section 50.

As illustrated in FIG. 5A, the fastener 18 is drilled into the floor surface 30 at the ridge 40. During this first step, the unthreaded section 52 of fastener 18 is drilled into the floor surface 30 and the threaded section 50 is positioned above the floor surface 30 to not engage the floor surface 30. The fastener 18 may include a cutting portion 60 such as a drilling tip which is used to pierce through the flooring substrate 22. As illustrated in FIG. 5B, the fastener 18 is further drilled through the hollow core 34 and into the lower flange 36 of the flooring substrate 22 and the upper surface 26 of the support substrate 24. The unthreaded section 52 has a length Li from the distal end 48 to the beginning of the lowermost thread of the threaded section 50 that is at least equal to a depth Di between the ridge 40 of the floor surface 30 of the flooring substrate 22 to the upper surface 26 of the support substrate 23. Therefore, the unthreaded section 52 extends through the floor surface 30 and into the upper surface 26 of the support substrate 24 without the threaded section 50 engaging the flooring substrate 22. Pivoting of the fastener 18 away from the desired axis A of installation is prevented or reduced by drilling the fastener 18 through the flooring substrate 22 and into the support substrate 24, fixing the axis of installation prior to the threaded edges 54 of the threaded section 50 engaging the flooring substrate 22. Moreover, as the cutting portion 60 penetrates the support substrate 24, the cutting portion 60 may require multiple revolutions before the cutting portion 60 is able to penetrate the upper surface of the support substrate 60 due to variation in the material hardness of the support substrate 24. Stripping of threads in the flooring substrate 22 is prevented or reduced by drilling the cutting portion 60 and the unthreaded section 52 into the support substrate 24 prior to the threaded section 50 penetrating the flooring substrate 22. Thus, a first pair of threads may be cut into the flooring substrate 20 from the threaded edge 54 of the threaded section 50 allowing a better clamp load between the fastener 18 and the flooring substrate 20 and the support substrate 24.

As illustrated in FIG. 5C, once the unthreaded section 52 of the fastener 18 has been drilled into the upper surface 26 of the support substrate 24 and the axis A of installation is fixed through both the flooring substrate 22 and the support substrate 24, the threaded section 50 is screwed into the floor surface 30 until the head portion 42 abuts the ridge surface 40. The ridge 40 may extend into the cross-section of the flooring substrate 22 a depth to accommodate the head portion 42 of the fastener 18. Thus, when the head portion 42 of the fastener 18 abuts the ridge 40 in an installed position, the head portion 42 is horizontally flush with the floor surface 30 to create a generally flat floor surface. In this position, the fastener 18 does not interfere or catch on items placed on the floor surface 30. The threaded section 50 extends through the floor surface 30, the hollow cavity 34, the lower flange 36 and the upper surface 26 of the support substrate 24, further driving the unthreaded section 52 below the upper surface 26 of the support substrate 24 and allowing the threaded section 50 to create a secure connection with each layer of the flooring substrate 22 and the support substrate 24.

Figure 6:
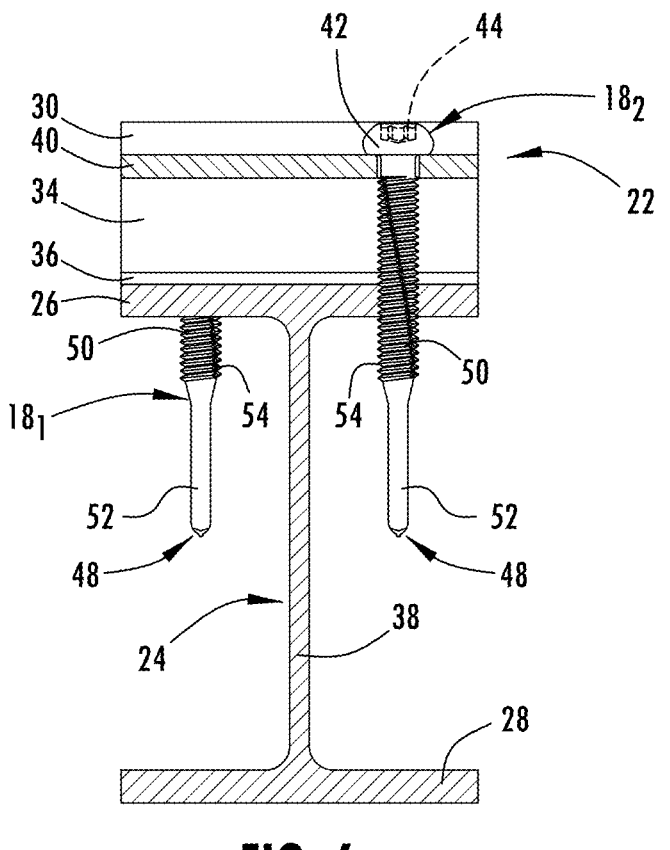
FIG. 6 is a schematic side view of the layered floor of FIG. 3 along line VI.

Referring to FIG. 6, a cross-sectional side view of the layered flooring illustrated in FIG. 3 is shown. A first fastener 181, or a plurality of first fasteners, may be installed on a first side of the vertical support 38 of the I-beam support substrate 24. A second fastener 182, or a plurality of second fasteners, may be installed on a second side of the vertical support 38 of the I-beam support substrate 24. Thus, the first and second fasteners 181, 182 may be installed to fasten the flooring substrate 22 to the support substrate 24 on either side of the vertical support 38. The first and second fasteners 181, 182 may be installed in alternative rows such that the first fastener 181 may be installed in a first ridge 40 and the second fastener 182 may be installed in a second ridge 40, on the floor surface 30. In examples with a plurality of first and second fasteners, the first and second fasteners may further alternate along the length of the flooring 12 to provide an even compression along the length of the vertical support 38.

Figure 7:
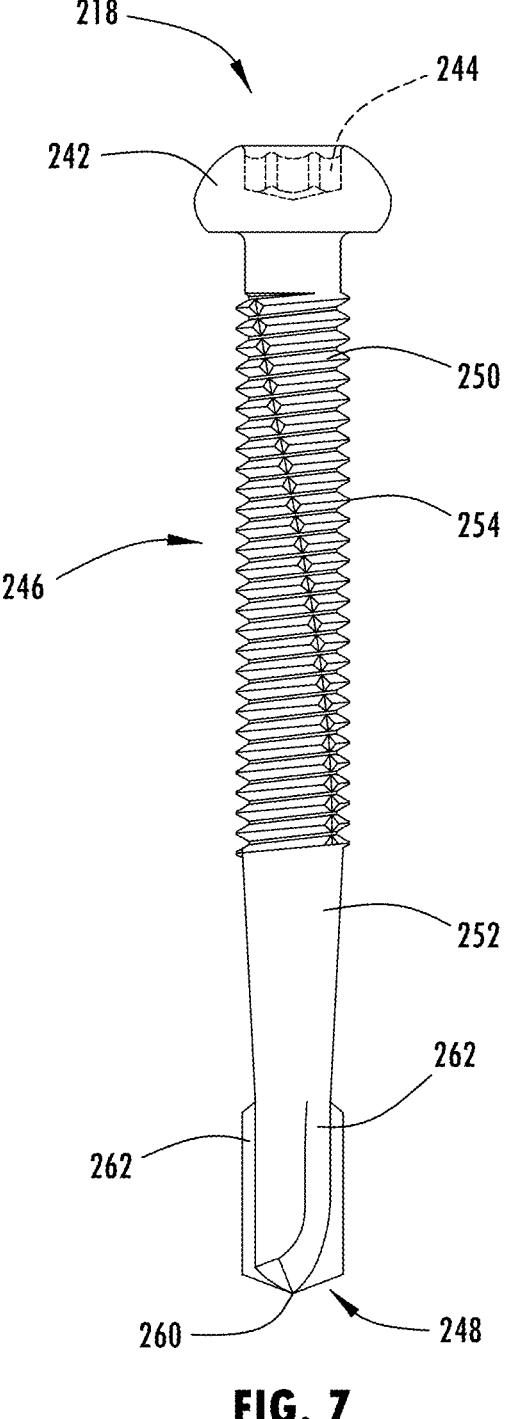
FIG. 7 is a schematic front view of an exemplary self-drilling screw.
Figure 8:
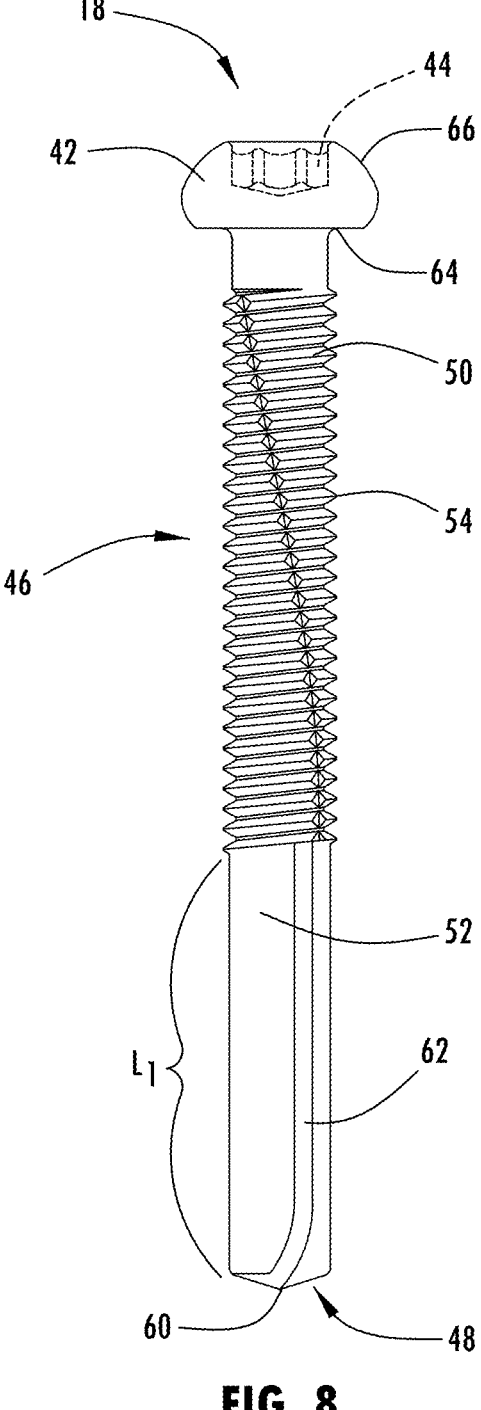
FIG. 8 is a schematic front view of an exemplary self-drilling screw.
Figure 9:
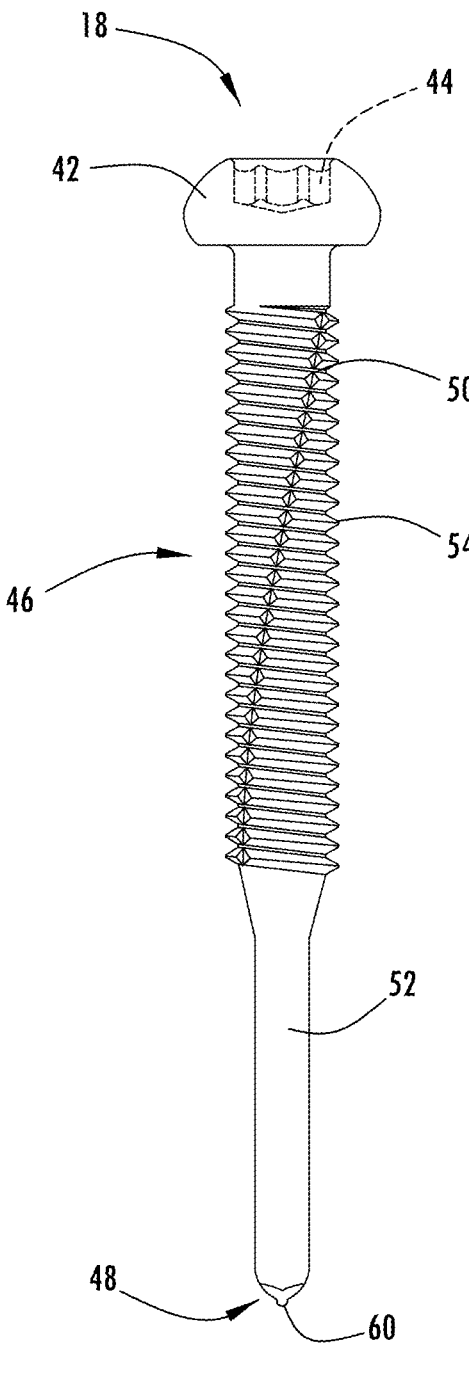
FIG. 9 is a schematic side view of the exemplary self-drilling screw of FIG. 8.
Figure 10:
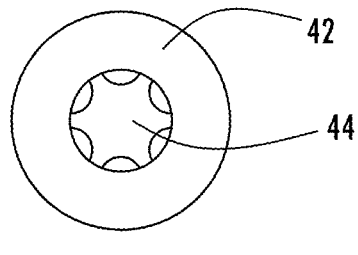
FIG. 10 is a schematic top view of the exemplary self-drilling screw of FIG. 8.
Figure 11:
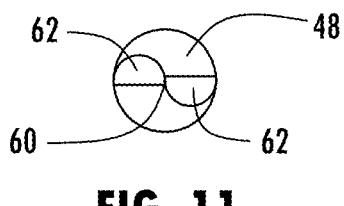
FIG. 11 is a schematic bottom view of the exemplary self-drilling screw of FIG. 8.

Referring to FIG. 7, an exemplary fastener 218 is illustrated. The fastener 218 includes a head portion 242 having a rounded top surface 266 and a generally flat bottom surface 264. The head portion 242 includes a drive portion 244 extending into the head portion 242 from the rounded top surface 266 and configured to receive a driver for manually or automatically rotating the fastener 218 about an axis A of the fastener 218. The bottom surface 264 of the head portion 242 is attached to a shank portion 246 which extends to a distal end 248. The shank portion 246 includes a threaded section 250 having an outer threaded edge 254 that extends helically along the shank portion 246. Between the threaded section 250 and the distal end 248 is an unthreaded section 252. The unthreaded section 252 has a length that is at least as long as the depth between the flooring substrate and the support substrate of a layered floor in which the fastener 218 is being installed. The unthreaded section 252 may have a circumference that tapers from the threaded section 250 to the distal end 248. The distal end 248 may include a cutting portion 260 having a plurality of cutting flutes 262. The plurality of cutting flutes 262 may extend helically along opposing sides of the cutting portion 260. The cutting flutes 262 may be configured to cut through the floor surface to assist with drilling the fastener 218 into the floor surface, especially under manual installation.

Referring to FIGS. 8-11, the exemplary fastener 18 illustrated in FIGS. 3-6 is shown in greater detail. The fastener 18 includes a head portion 42 having a rounded top surface 66 and a generally flat bottom surface 64. The head portion 42 includes a drive portion 44 extending into the cross-section of the head portion 42 from the rounded top surface 66. The drive portion 44 is configured to receive a driver for manually or automatically rotating the fastener 18 about an axis of the fastener 18. For example, the drive portion 44 may include a torx shaped receiving hole to receive a corresponding torx driver. In other examples, the drive portion may be configured to receive other types of drivers. The fastener 18 includes a shank portion 46 which is attached to the bottom surface 64 of the head portion 42. The shank portion 46 is a cylindrical body extending from the head portion 42 to a distal end 48. The shank portion 46 includes a threaded section 50 having an outer threaded edge 54 that extends helically along the shank portion 46. Between the threaded section 50 and the distal end 48 is an unthreaded section 52. The unthreaded section 52 has a length that is at least as long as the depth between the flooring substrate and the support substrate of a layered floor in which the fastener 18 is being installed. In some examples, the unthreaded section 52 has a circumference that is tapered from the threaded section 50 to the distal end 48 or in only a portion of the shank 46 from the threaded section 50 to the distal end 48. In other examples, the unthreaded section may have a consistent circumference from the end of the threaded section 50 to the distal end 48. In some examples, the distal end 48 may include a cutting portion 60 configured as a drilling tip and two cutting flutes 62. The cutting flutes 62 may be diametrically opposite starting from the drilling tip 60 and defining a cutting angle at which the drilling tip 60 and cutting flutes 62 penetrate the flooring substrate. The fastener 18 may be comprised of a carbon steel. In some examples, the fastener 18 is comprised of a inner core having a first material and an outer case having a second material. In some examples, the inner core and the outer case may be comprised of carbon steels having a different hardness. The inner core may have a hardness less than the outer case. For example, the inner core may be a C30 steel and the outer case may be a C45 steel. In some examples, the fastener may also be coated in a phosphate such as a zinc coating to provide corrosion resistance and lubrication.

Figure 12:
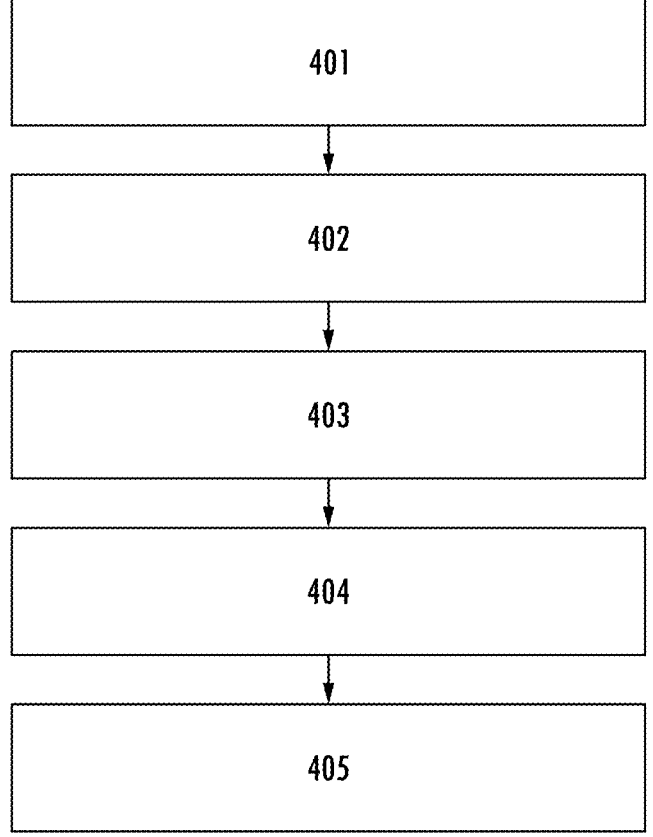
FIG. 12 is a flow chart illustrating a method of installing a self-drilling screw.

Referring to FIG. 12, a method of installing a fastener in a layered material is provided. At 401, a driver is provided with the exemplary fastener. In some examples, the fastener may be installed with an automated gang screw driver to quickly and efficiently automatically install fasteners into a trailer floor. In other examples, the fastener may be installed manually or with other automatic drivers. The fastener includes a head portion having a driver portion configured to receive a driver and rotate the fastener about the fastener axis.

At 402, the fastener is drilled through a first layer of material, the flooring substrate (see e.g., FIG. 5A). The fastener includes a shank portion extending from the head portion having a threaded section and an unthreaded section. The threaded section is between the head portion and the unthreaded section, with the unthreaded section extending from the threaded section to the distal end. During this step, only the unthreaded section is drilled into the first layer of material.

At 403, the fastener is further drilled into the second layer of material, the support substrate (see e.g., FIG. 5B). The unthreaded section of the fastener has a length that is at least equal to the depth between the flooring substrate and the support substrate. Thus, during this step, the unthreaded section extends through the flooring substrate and into the support substrate, while the threaded section has not yet engaged the flooring substrate. By engaging the support substrate without the threaded edges engaging the flooring substrate, the fastener is able to pierce the support substrate without the ridges creating a pivoting or wobbling effect on the fastener, thus allowing a more accurate and straight installation of the fastener through the hollow cavity of the flooring substrate and into the second layer support substrate. Further, where the material hardness varies between the flooring substrate and the support substrate, drilling into the support substrate may require the fastener to undergo several rotations before penetrating the support substrate. By having a length of the unthreaded section which keeps the threaded section from engaging the flooring substrate, the fastener may rotate several time during this 'stalling' process without the threaded edge of the threaded section cutting threads into the flooring substrate and subsequently stripping the threads. Rather, the unthreaded section may rotate in the flooring substrate without forming threads in the flooring substrate so that threads may be formed after stalling occurs.

At 404, once stalling has ended and the unthreaded section has punctured the support substrate and created an installation path through the flooring substrate and the support substrate that is aligned, then the threaded section is screwed into the first layer of material, the flooring substrate. The threaded edges of the threaded section engage the flooring substrate, cutting through the flooring substrate to create threads in the flooring substrate, forming a secure connection between the flooring substrate and the fastener with a high clamp load.

At 405, the fastener is screwed into the support substrate until the head portion abuts the upper surface of the flooring substrate (see e.g., FIG. 5C). In this step, the fastener reaches its fully installed position. The head portion may abut the floor surface in a concave ridge of the floor surface such that the top of the fastener is flush with the floor surface of the flooring substrate. The threaded section extends through the floor surface and a lower flange or surface of the flooring substrate, and into or through the support substrate. The threaded edges of the threaded section create a further secured connection with the flooring substrate and the support substrate, cutting corresponding threads into the substrates that interlock with the threaded edges of the threaded section.

Thus, according to the disclosure, the flooring system includes a flooring substrate having a hollow core, a support substrate supporting the flooring substrate, and a fastener engaging the flooring substrate to the support substrate. The fastener includes a head portion and a shank portion. The head portion is configured for receiving a screw driver to rotate the fastener about an axis. The shank portion extends along the axis from the head portion to a distal end and includes (i) a threaded section between the distal end and the head portion, and (ii) an unthreaded section between the distal end and the threaded section. The threaded section has an outer threaded edge extending helically along the shank portion. The unthreaded section has a length along the axis that is at least a depth between the flooring substrate and the support substrate.

Also according to the disclosure, a fastener for installation in a two-layered material includes a cylindrical shank. The cylindrical shank includes a head portion, an unthreaded section, and a threaded section. The head portion is at a proximate end and is configured to receive a driver for rotating the shank. The unthreaded section is at a distal end and is configured to cut into the two-layered material. The threaded section has an outer threaded edge extending helically along the cylindrical shank and is positioned between the head portion and the unthreaded section. A length of the unthreaded section is proportional to a depth between a first layer of installation material and a second layer of installation material.

Also, a method for installing a fastener in a two-layered material includes providing an automated gang screw driver with a fastener, the fastener comprising an unthreaded section, a threaded section, and a head portion configured to be engaged by the automated gang screw driver, drilling the unthreaded section through a first layer of material and into the surface of a second layer of material and screwing the threaded section into the first layer of the material, where the threaded section is configured to engage the first layer of material after the unthreaded section is drilled into the surface of the second layer of material.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature; may be achieved with the two components (electrical or mechanical) and any additional intermediate members being integrally formed as a single unitary body with one another or with the two components; and may be permanent in nature or may be removable or releasable in nature, unless otherwise stated.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. Furthermore, the terms "first," "second,"

and the like, as used herein do not denote any order, quantity, or importance, but rather are used to denote element from another.

Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. For example, the terms "approximately," "about," and "substantially" may refer to an amount that is within less than 5% of, within less than 1% of, within less than 0.1% of, and within less than 0.01% of a stated amount.

Further, it should be understood that any directions or reference frames in the preceding description are merely relative directions or movements. For example, the terms "upper," "lower," "right," "left," "rear," "front," "vertical," "horizontal," and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system comprising:
a flooring substrate having an upper layer and a lower layer with a hollow core disposed between the upper and lower layers, wherein an unsupported drilling depth is defined between an upper surface of the upper layer and an upper surface of the lower layer;
a support substrate supporting the flooring substrate; and
a fastener engaging the flooring substrate to the support substrate, the fastener comprising:
a head portion for receiving a screw driver configured to rotate the fastener about an axis of the fastener; and
a shank portion extending along the axis from the head portion to a distal end configured to pierce through the flooring substrate and the support substrate, the shank portion having (i) a threaded section between the distal end and the head portion, and (ii) an unthreaded section between the distal end and the threaded section,
wherein the threaded section has an outer threaded edge extending helically along the shank portion; and
wherein the unthreaded section has a length along the axis of the fastener that is at least equal to the unsupported drilling depth.

2. The system of claim 1, wherein the distal end includes a cutting portion configured to cut through the flooring substrate and the support substrate.

3. The system of claim 2, wherein the cutting portion includes a plurality of cutting flutes on opposing sides of the shank portion.

4. The system of claim 1, wherein the unthreaded section has a circumference that tapers from the threaded section to the distal end.

5. The system of claim 1, wherein the flooring substrate includes a floor surface and a lower flange defining the hollow core, the lower flange supported on an upper surface of the support substrate.

6. The system of claim 5, wherein the length of the unthreaded section is at least a depth of the flooring substrate between the floor surface and the upper surface of the support substrate.

7. The system of claim 1, wherein the flooring substrate is comprised of a first material and the support substrate is comprised of a second material.

8. The system of claim 7, wherein at least one of the first material or the second material are comprised of aluminum.

9. The system of claim 1, wherein the length of the threaded section along the shank portion from the head portion is greater than a depth of the flooring substrate.

* * * * *